United States Patent [19]

Kim

[11] Patent Number: 5,359,420
[45] Date of Patent: Oct. 25, 1994

[54] MACRO BLOCK ADDRESS PROCESSOR FOR DIGITAL COMPRESSED VIDEO SIGNAL DECODER

[75] Inventor: Young M. Kim, Seoul, Rep. of Korea

[73] Assignee: Goldstar Co., Ltd., Seoul, Rep. of Korea

[21] Appl. No.: 61,906

[22] Filed: May 14, 1993

[30] Foreign Application Priority Data

Aug. 22, 1992 [KR] Rep. of Korea .............. 15154/1992

[51] Int. Cl.$^5$ ............................................. H04N 7/130
[52] U.S. Cl. ............................................. 348/384
[58] Field of Search ......................... 358/133, 136; H04N 7/130

[56] References Cited

U.S. PATENT DOCUMENTS

| | | | |
|---|---|---|---|
| 5,121,205 | 6/1992 | Ng et al. | 358/133 |
| 5,146,325 | 9/1992 | Ng | 358/136 |
| 5,212,549 | 5/1993 | Ng et al. | 358/136 |
| 5,241,382 | 8/1993 | Paik et al. | 358/133 |

Primary Examiner—Tommy P. Chin
Assistant Examiner—Richard Lee
Attorney, Agent, or Firm—Fliesler, Dubb, Meyer & Lovejoy

[57] ABSTRACT

A macro block address processor for a digital compressed video signal decoder, comprising input run/level memories for storing a zero run value and a level value for each macro block coefficient data from a decoding section, respectively, an absolute macro block address generator for converting relative macro block addresses inputted therein into absolute macro block addresses using a slice start code, an absolute macro block address memory for storing an output signal from the absolute macro block address generator, a macro block address counter for sequentially counting macro black addresses by one slice in response to a macro black clock, a comparator for comparing an output signal from the absolute macro block address memory with an output signal from the macro block address counter, a read control let for controlling a read operation of the absolute macro block address memory in response to an output signal from the comparator, and a multiplexer for selecting one of the zero run value from the run memory and a zero run value from one of the level value from said level memory means, or for selecting a zero run value from zero setting means and a level value from said zero setting means in response to the output signal from the comparator and outputting the selected values to a coefficient generator.

1 Claim, 2 Drawing Sheets

BLOCK

MACRO BLOCK

SLICE

MACRO BLOCK ADDRESS PROCESSOR FOR DIGITAL COMPRESSED VIDEO SIGNAL DECODER

BACKGROUND OF THE INVENTION

1. Field of the Invention

The present invention relates in general to the process of macro block addresses (MBAs) for expanding a compressed video signal as in a HDTV, and more particularly to a macro block address processor for a digital compressed video signal decoder which is capable of processing macro block addresses successively and stably.

2. Description of the Prior Art

FIG. 1A, FIG. 1B and FIG. 1C illustrate a general relationship among data blocks, macro blocks and slices in encoding/decoding a digital video signal. As shown in this drawing, the digital compressed or encoded video signal is partitioned into the data blocks→the macro blocks→the slices. Each macro block is composed of a fixed number of data blocks and is coded into coefficient data. A macro block address is sent to indicate a position of each macro block. The macro block addresses skip over the macro blocks to which no data is to be transmitted and are sent as relative position data to indicate the macro blocks to which data are to be transmitted practically, thereby to make the efficiency of the signal compression higher. In such a system that expands the digital compressed video signal to restore it to its original state, the process of all macro blocks is performed using the relative macro block addresses, as shown in FIG., 2.

FIG. 2 is a block diagram of a conventional macro block address processor for a digital compressed video signal decoder. As shown in this drawing, the conventional macro block address processor comprises a multiplexer 10 for selecting one of a zero run value for each macro block coefficient data and a zero run value from a zero setter 11 and one of a level value for each macro block coefficient data and a level value from the zero setter 11 in response to a select signal. A down-counter 14 is adapted to count relative macro block addresses and output the counted values as the select signals to the multiplexer 10. A first-in first-out (FIFO) RAM 12 is provided to sequentially store the run values selected by the multiplexer 10 and output them to a coefficient generator (not shown) in the stored order. A FIFO RAM 13 is provided to sequentially store the level values selected by the multiplexer 10 and output them to the coefficient generator in the stored order.

In operation, under the condition that the down-counter 14 counts the macro block addresses and outputs the counted values as the select signals to the multiplexer 10, the zero run value for each macro block coefficient data is selected by the multiplexer 10 and then stored in the FIFO RAM 12 and the level value for each macro block coefficient data is selected by the multiplexer 10 and then stored in the FIFO RAM 13. The FIFO RAMs 12 and 13 then output the stored values to the coefficient generator.

On the other hand, when the down-counter 14 counts the coefficient data for omitted macro blocks as a result of counting the relative macro block addresses, the zero run values from the zero setter 11 are selected by the multiplexer 10 and then stored in the FIFO RAM 12 and the level values from the zero setter 11 are selected by the multiplexer 10 and then stored in the FIFO RAM 13. The FIFO RAMs 12 and 13 then output the stored values to the coefficient generator. The output of the down-counter 14 is also applied as a hold signal to the preceding processing section. The hold signal from the down-counter 14 causes the preceding processing operation to be stopped. As the preceding processing operation is stopped, "O" is produced as the coefficient data for the omitted macro blocks. This means that only the required macro block data must be inputted successively in the signal compression, while all macro block data must be produced in the signal expansion.

However, the conventional macro block address processor has a disadvantage, in that it is not easy to control stopping the preceding processing operation while producing the data for the omitted macro blocks. Also, the control may result in an unstable operation of the macro block address processor.

SUMMARY OF THE INVENTION

Therefore, the present invention has been made in view of the above problems, and it is an object of the present invention to provide a macro block address processor for a digital compressed video signal decoder which is capable of processing macro block addresses successively and stably.

In accordance with the present invention, the above and other objects can be accomplished by a provision of a macro block address processor for a digital compressed video signal decoder, comprising: input run/-level memory means for storing a zero run value and a level value for each macro block coefficient data from decoding means, respectively; absolute macro block address generating means for converting relative macro block addresses inputted therein into absolute macro block addresses using a slice start code; absolute macro block address memory means for storing an output signal from said absolute macro block address generating means; macro block address counting means for sequentially counting macro block addresses by one slice in response to a macro block clock; comparing means for comparing an output signal from said absolute macro block address memory means with an output signal from said macro block address counting means; read control means for controlling a read operation of said absolute macro block address memory means in response to an output signal from said comparing means; and multiplexing means for selecting one of the zero run value from said run memory means and one of the level value from said level memory means, or for selecting a zero run value from zero setting means and a level value from said zero setting means, in response to the output signal from said comparing means and outputting the selected values to coefficient generating means.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1A:
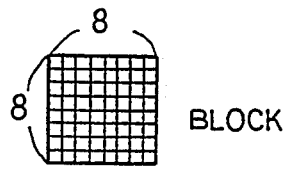
FIG. 1A, FIG. 1B, and FIG. 1C illustrate a general relationship among data blocks, macro blocks and slices in encoding/decoding a digital video signal.
Figure 1B:
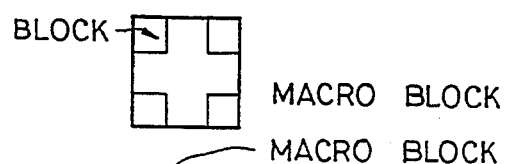
Figure 1C:
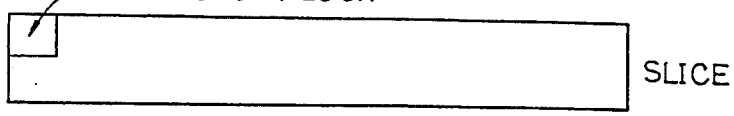
Figure 2:
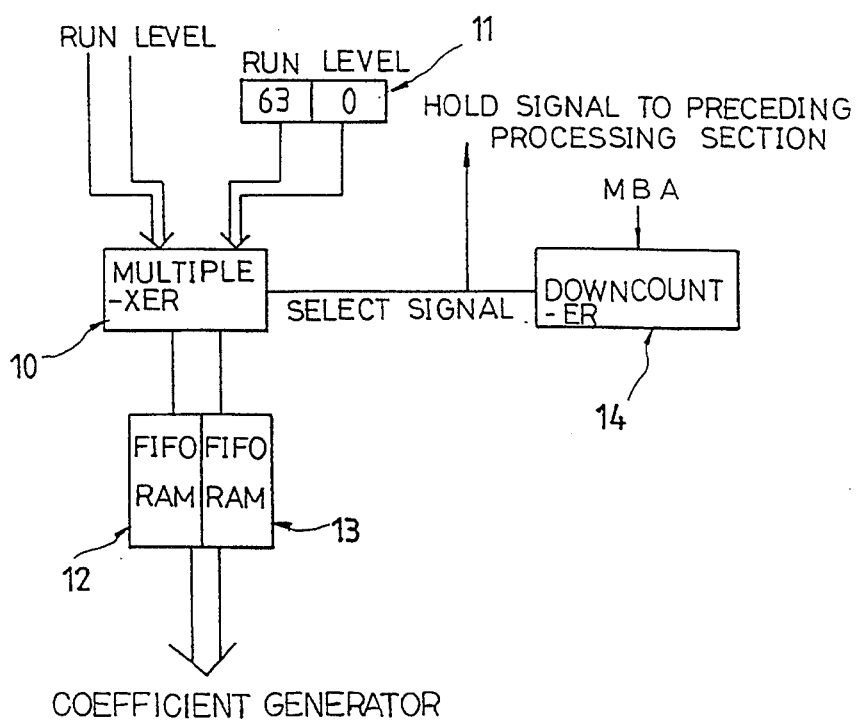
FIG. 2 is a block diagram of a conventional macro block address processor for a digital compressed video signal decoder.
Figure 3:
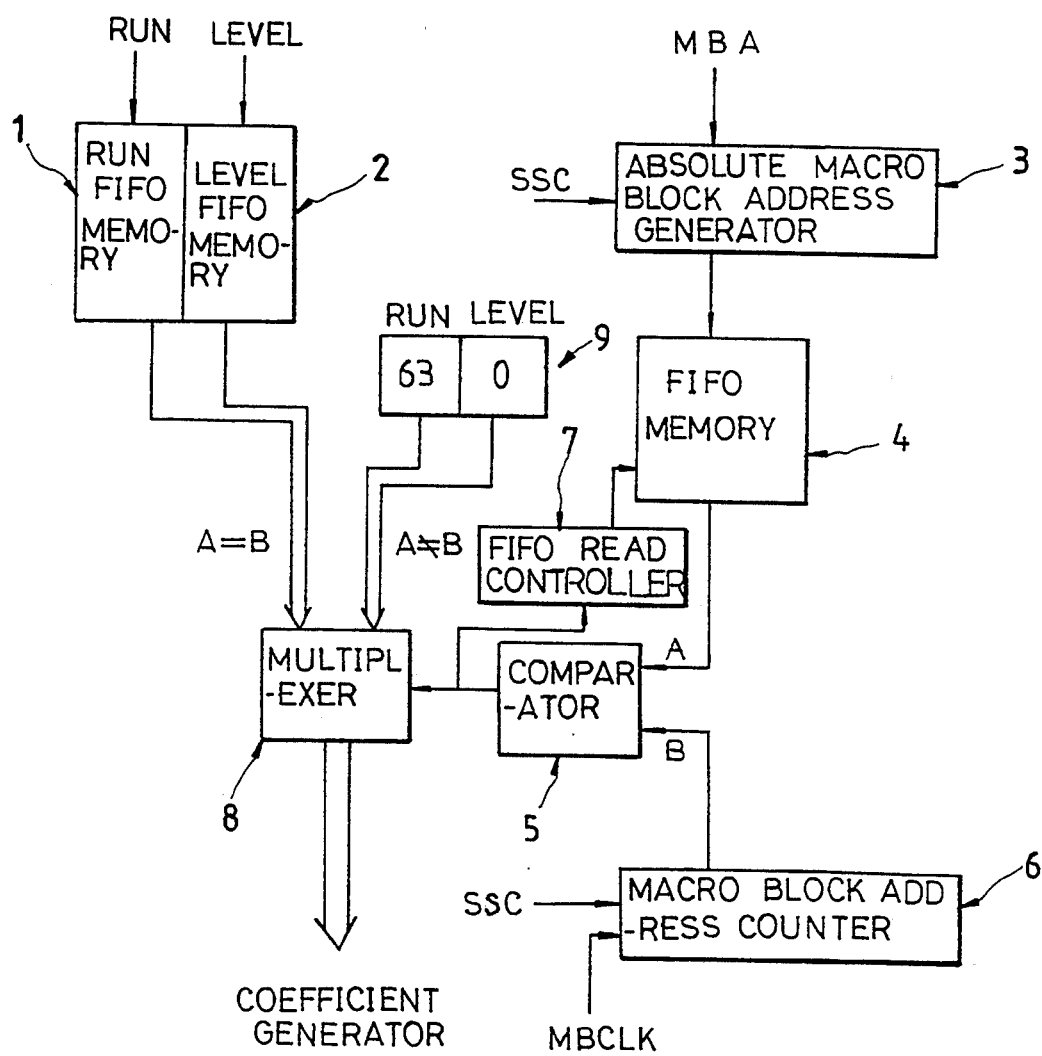
FIG. 3 is a block diagram of a macro block address processor for a digital compressed video signal decoder in accordance with the present invention.

Referring to FIG. 3, there is shown a block diagram of a macro block address processor for a digital compressed video signal decoder in accordance with the present invention. As shown in this drawing, the macro block address processor of the present invention comprises input run/level memories 1 and 2 for storing a zero run value and a level value for each macro block coefficient data from a decoding section, respectively, and an absolute macro block address generator 3 for converting relative macro block addresses (MBAs) inputted therein into absolute macro block addresses using a slice start code SSC. An absolute macro block address memory 4 is provided to store an output signal from the absolute macro block address generator 3. A macro block address counter 6 is adapted to sequentially count macro block addresses by one slice in response to a macro block clock MBCLK. The run/level memories 1 and 2 and the memory 4 are FIFO memories.

The macro block address processor of the present invention also comprises a comparator 5 for comparing an output signal from the absolute macro block address memory 4 with an output signal from the macro block address counter 6, a read controller 7 for controlling a read operation of the absolute macro block address memory 4 in response to an output signal from the comparator 5, and a multiplexer 8 for selecting one of the zero run value from the run memory 1 and a zero run value from a zero setter 9 and one of the level value from the level memory 2 and a level value from the zero setter 9 in response to the output signal from the comparator 5 and outputting the selected values to a coefficient generator (not shown).

The operation of the macro block address processor with the above-mentioned construction will hereinafter be described in detail.

First, a digital compressed video signal is decoded at the decoding section which precedes the macro block address processor and then inputted to the macro block address processor. At this time, the zero run value and the level value for each macro block coefficient data from the decoding section are stored in the run/level memories 1 and 2, respectively, and the corresponding relative macro block addresses are applied to the absolute macro block address generator 3. The relative macro block addresses are converted into the absolute macro block addresses by the absolute macro block address generator 3. In this case, since the absolute macro block addresses are in the unit of slice, the absolute macro block address generator 3 generates the absolute macro block addresses using the slice start code SSC.

The macro block address counter 6 sequentially counts the macro block addresses by one slice in response to the macro block clock MBCLK. The comparator 5 compares the counted value B from the macro block address counter 6 with the absolute macro block address A from the absolute macro block address memory 4. If the counted value B is equal to the absolute macro block address A, i.e., A=B, the zero run value from the input run memory 1 and the level value from the input level memory 2 are selected by the multiplexer 8 and then outputted to the coefficient generator. Namely, the output A=B of the comparator 5 means that the corresponding macro block MB is not one omitted in the signal compression.

On the other hand, when the counted value B is not equal to the absolute macro block address A, i.e., A≠B, data must be generated for the corresponding macro block MB. Namely, the output A≠B of the comparator 5 means that the corresponding macro block MB is one omitted in the signal compression. In this case, the zero run value (for example, 63) and the level value (for example, 0) from the zero setter 9 are selected by the multiplexer 8 and then outputted to the coefficient generator. At this time, in response to the output of the comparator 5, the read controller 7 controls the read operation of the absolute macro block address memory 4 so that the output A of the absolute macro block address memory 4 is not varied or read until the output B of the macro block address counter 6 and the memory output A become the same.

As a result, the stored zero run/level values are outputted with respect to the macro blocks to which information are transmitted, while the zero run/level values from the zero setter 9 are outputted with respect to the macro blocks to which no information is transmitted. This means that the coefficient data can be produced for all macro blocks. Therefore, the macro block address processor is capable of inputting and processing the macro block addresses successively. For this reason, there is no necessity for stopping the operation of the decoding section at the front stage of the macro block address processor.

As hereinbefore described, according to the present invention, all macro block data can be outputted successively and stably on the basis of the relative macro block addresses (MBAs). Also, there is no necessity for stopping the operation of the decoding section at the front stage of the macro block address processor while the data are produced for the omitted macro blocks.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A macro block address processor for a digital compressed video signal decoder, comprising:
    input run and level memory means for storing a zero run value and a level value for each macro block coefficient data from decoding means, respectively;
    absolute macro block address generating means for converting relative macro block addresses inputted therein into absolute macro block addresses using a slice start code;
    absolute macro block address memory means for storing an output signal from said absolute macro block address generating means;
    macro block address counting means for sequentially counting macro block addresses by one slice in response to a macro block clock;
    comparing means for comparing an output signal from said absolute macro block address memory means with an output signal from said macro block address counting means;
    read control means for controlling a read operation of said absolute macro block address memory means in response to an output signal from said comparing means; and multiplexing means for selecting one of the zero run value from said run memory means and one of the level value from the level memory, or for selecting a zero run value from a zero setter and a level value from the zero setter, in response to the output signal from said comparing means and outputting the selected values to coefficient generating means.

* * * * *